(12) United States Patent
Kaminsky et al.

(10) Patent No.: US 9,281,993 B2
(45) Date of Patent: Mar. 8, 2016

(54) METHOD AND SYSTEM TO DISTRIBUTE POLICIES

(71) Applicant: INTERNATIONAL BUSINESS MACHINES CORPORATION, Armonk, NY (US)

(72) Inventors: David L. Kaminsky, Chapel Hill, NC (US); Christina Born, Durham, NC (US); Carrie S. Cheng, Cary, NC (US); Eric Kirschstein, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/897,044

(22) Filed: May 17, 2013

(65) Prior Publication Data
US 2013/0262688 A1    Oct. 3, 2013

Related U.S. Application Data

(63) Continuation of application No. 10/707,408, filed on Dec. 11, 2003, now Pat. No. 8,495,227.

(51) Int. Cl.
*G06F 15/16* (2006.01)
*H04L 12/24* (2006.01)
*G06Q 10/10* (2012.01)

(52) U.S. Cl.
CPC ............. *H04L 41/00* (2013.01); *G06Q 10/10* (2013.01); *H04L 41/0893* (2013.01)

(58) Field of Classification Search
CPC ..................................................... H04L 63/20
USPC ............................... 709/217, 225, 229; 705/1
See application file for complete search history.

(56) References Cited

U.S. PATENT DOCUMENTS

| | | | |
|---|---|---|---|
| 6,510,513 B1 * | 1/2003 | Danieli | 713/156 |
| 6,621,793 B2 * | 9/2003 | Widegren et al. | 370/230.1 |
| 6,826,609 B1 | 11/2004 | Smith et al. | |
| 6,981,029 B1 | 12/2005 | Menditto et al. | |
| 7,032,022 B1 * | 4/2006 | Shanumgam et al. | 709/225 |
| 7,103,351 B2 | 9/2006 | Chaudhari et al. | |
| 2001/0039576 A1 * | 11/2001 | Kanada | 709/223 |
| 2003/0110192 A1 * | 6/2003 | Valente et al. | 707/513 |

* cited by examiner

*Primary Examiner* — Glenford Madamba
(74) *Attorney, Agent, or Firm* — Charles L. Moore; Moore & Van Allen PLLC

(57) ABSTRACT

A method to distribute policies may include transmitting one of an identification (ID) assigned to a policy template or the policy template associated with each policy to an enforcement point or selected enforcement points for enforcement. The method may also include transmitting one set of parameters to be used in each policy template to the enforcement point.

15 Claims, 4 Drawing Sheets

METHOD AND SYSTEM TO DISTRIBUTE POLICIES

CROSS-REFERENCE TO RELATED APPLICATIONS

This application is a continuation of U.S. patent application Ser. No. 10/707,408, filed on Dec. 11, 2003, and is hereby incorporated herein in its entirety by reference.

BACKGROUND

The present invention relates to policies for software applications, network management, e-commerce or business and the like, and more particularly to a system and method to distribute policies or the like.

Policies may be defined or developed to control software applications, network management, e-commerce or business or similar communication or data processing activities. Such policies may include "if-then" clauses or similar statements or definitions. An example of one policy may be "if some precondition, then perform some predefined action, or set some value or the like." In another example, the policy may be "if some precondition and some other precondition or preconditions, then perform some predefined action, set some value or the like." Policies can have a typical lifecycle. Over time, policies may be updated to meet changing conditions or needs or may become outdated and deleted or changed to new policies. Efficiently defining, storing, distributing and enforcing policies can be a challenge. Under some circumstances only minor changes or selected parameters or values used in a policy or related group of polices may need to be changed. Defining an entirely new policy or set of policies, storing the entirely new policy or policies, distributing the policies to all enforcement points and making adjustments at each of the enforcement points to implement and enforce the policies may be burdensome, time consuming and involve inefficient use of limited data processing, storage and communication resources.

SUMMARY

In accordance with an embodiment of the present invention, a method to distribute policies may include transmitting one of an identification (ID) assigned to a policy template or the policy template associated with each policy to an enforcement point or selected enforcement points for enforcement or implementation. Only the ID rather than the entire template need be transmitted to the enforcement point if the enforcement point already has the template. The method may also include transmitting one set of parameters or variable values to be used in each policy template to the enforcement point or selected enforcement points.

In accordance with another embodiment of the present invention, a method to distribute policies may include defining a policy template associated with each policy. A unique identification (ID) may be assigned to each policy template and the policy template and ID may be stored. One of the assigned ID or the policy template for each policy to be enforced or implemented may be transmitted to each enforcement point intended to enforce the policy. The assigned ID rather than the entire template may be transmitted if the enforcement point already has the policy template.

In accordance with another embodiment of the present invention, a system to distribute policies may include a policy administrator to define policy templates and to transmit one of an ID assigned to a policy template or the policy template associated with each policy to be enforced. An enforcement point may receive the ID assigned to the policy template or the template for each policy to be enforced. The enforcement point may then enforce or implement the policy.

In accordance with another embodiment of the present invention, a system to distribute policies may include means for defining a policy template associated with each policy. The system may also include means for assigning a unique ID to each policy template. A repository or similar storage device may store each policy template and assigned ID. The system may further include means for transmitting the assigned ID to an enforcement point, if the enforcement point already has the policy template. In another embodiment, the policy template for each policy to be enforced may be transmitted. An enforcement point may receive the assigned ID or policy template for each policy to implement or enforce the policy.

In accordance with another embodiment of the present invention, a computer-readable medium having computer-executable instructions for performing a method may include defining a policy template associated with each policy. The method may also include assigning a unique ID to each policy template. The assigned ID rather than the complete policy template may be transmitted to the enforcement point for each policy to be enforced, if the enforcement point already has the template. In another embodiment, the policy template may be transmitted to the enforcement point for enforcement, particularly if the enforcement point does not have the template.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
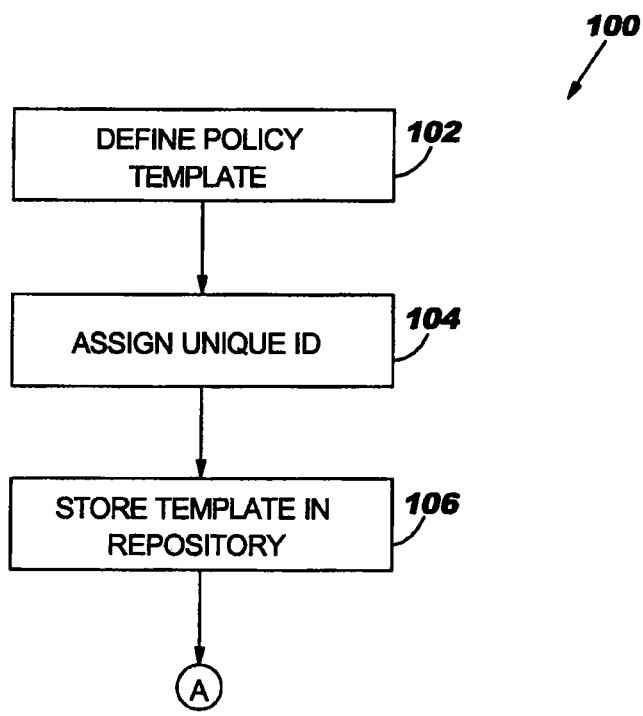
FIG. 1 is a flow chart of a method to define and store a policy template in accordance with an embodiment of the present invention.

FIG. 1 is a flow chart of a method 100 to define and store a policy template in accordance with an embodiment of the present invention. In block 102 a policy template associated with each policy may be defined. The policy template may be defined by a policy administrator or the like as described in more detail with respect to FIG. 4. The policy template may be defined or formed as a structured document. For example, the policy template may be formed in a mark-up language, such as extensible mark-up language (XML) or the like. An example of a policy document including policy templates in XML may be:

```
<PolicyDocument>
<HeaderInformation>
<Policy>
<precondition> if clause </precondition>
<decision> then clause </decision>
```

```
        </Policy>
        ...
        <Policy>
        ...
        </Policy>
</PolicyDocument>
```

Accordingly, the template may be in the form of an "if-then" clause or similar clause or statement, "if some precondition or preconditions, then some decision is made." The decision may be to perform some action, set a value or some other action or inaction. For example a template in XML may take the form, "if <shift> and <customer level> then <response time goal>," where "shift" might, for example, take legal values, "first", "second" and "third"; "customer level" might take "gold", "silver" and "bronze"; and "response time goal" might take "100 ms", "500 ms", or "1000 ms". Shift, customer level and response time goal may be referred to as parameters, variables or values that can be specified and changed from time to time to update the template and associated policy. As will be described in more detail herein, the templates and parameters may be transmitted separately for more efficiency and to reduce transmission costs by factoring the templates and parameters or data to be used in the templates. Different parameters may be transmitted from time to time without the need of transmitting the templates again thus increasing efficiency and reducing costs.

In block 104, a unique identification (ID) may be assigned to each policy template. The ID may be a serial number or a more descriptive identification of the template. As will be discussed in more detail herein, in at least one embodiment of the present invention, the ID may be transmitted rather than the complete policy template for efficiency and to reduce transmission costs and the use of limited data processing and communication resources.

In block 106, the policy template and its assigned ID associated with each policy may be stored in a repository or other data storage device or source. The policy templates may be indexed in the repository by their respective IDs.

Figure 2:
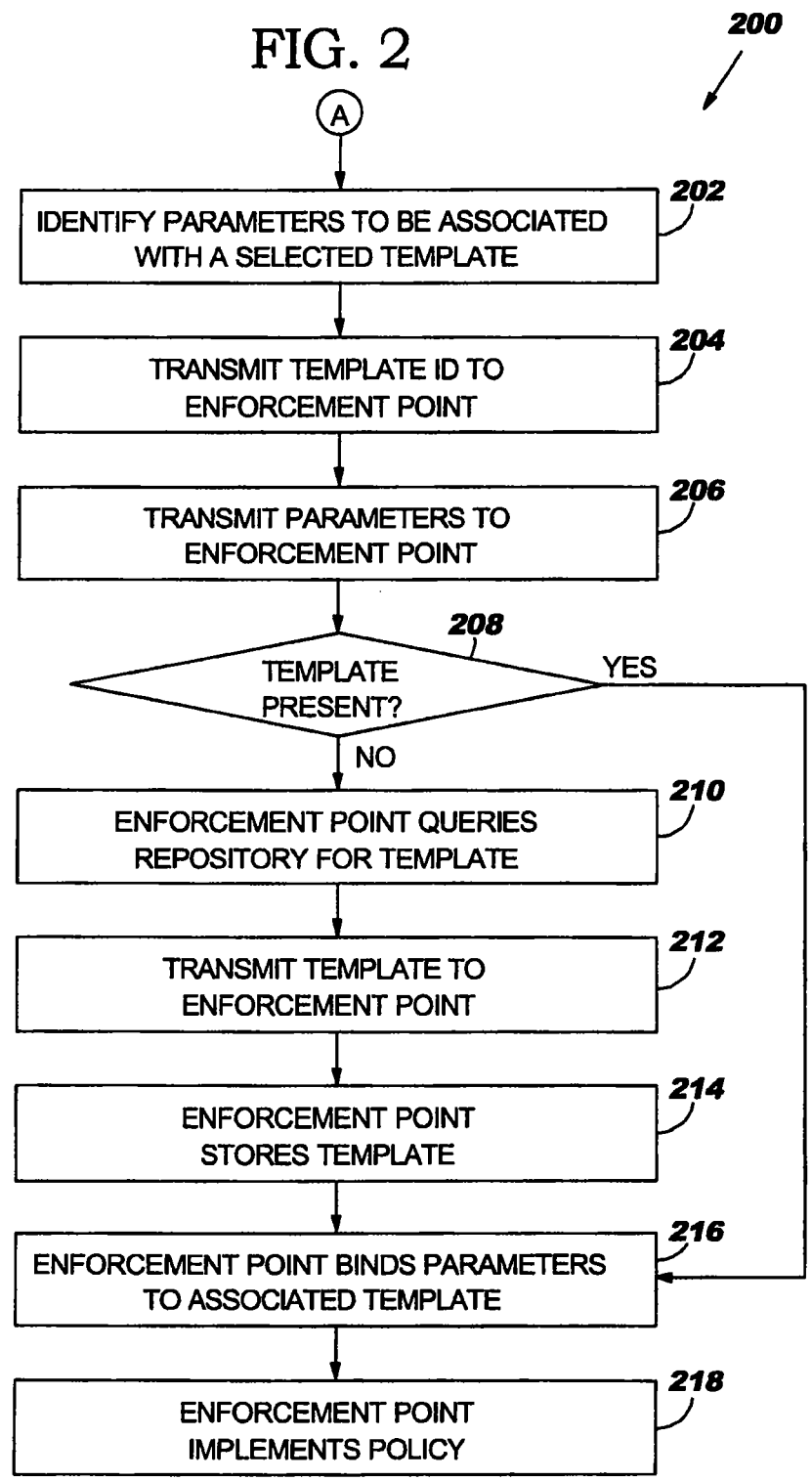
FIG. 2 is a flow chart of a method to distribute policies in accordance with an embodiment of the present invention.

FIG. 2 is a flow chart of a method 200 to distribute policies in accordance with an embodiment of the present invention. The method of 200 may be a follow-on or continuation of the method 100 of FIG. 1. The policy templates may be defined and stored in blocks 102 and 106 at different times and then distributed in method 200 at other times. In block 202, at least one set of parameters, variables, values or the like to be associated with each policy template may be identified or defined by a policy administrator or the like, or parameters may be identified or defined to be associated with a selected policy template. The parameters will be substituted or bound into the policy template for enforcement of the policy at an enforcement point. The parameters may be preconditions, values that are set if one or more preconditions are met, an operation to be performed if one or more preconditions are met or the like. Each parameter or set of parameters may be identified by name and type of parameter. Examples of types of parameters may include a precondition, a value, type of operation or function or the like. Each parameter or set of parameters may also be stored by the name and type of parameter or set of parameters. The parameters may be updated or changed from time to time in a selected policy template.

In block 204, a policy template ID may be transmitted by a policy administrator or the like to an enforcement point or to selected enforcement points for each policy to be enforced by the enforcement point or selected enforcement points. In block 206, the one set of parameters to be used in each associated policy template may be transmitted by the policy administrator to the respective enforcement points. In block 208, each enforcement point may determine if the policy template corresponding to each received template ID is present or stored at the enforcement point. If the policy template is available at the enforcement point, the method 200 may advance to block 216 and the enforcement point may substitute or bind the parameters to each associated policy template for enforcement. If the policy template is not present or stored at the enforcement point, the method 200 may advance to block 210. In block 210, the enforcement point may transmit a query to a repository or the like, where policy templates are stored or maintained. The query may be sent in response to each policy template corresponding to any IDs transmitted to the enforcement point that are not present or stored at the enforcement point. In block 212, any policy templates may be transmitted to the enforcement point in response to the query including any IDs assigned to the transmitted policy templates. Asynchronous, out-of-band communication or signaling may be applied or used to transmit queries and any policy templates. Compression may also be used to transmit templates and parameters to conserve communication resources. Any type of data compression and decompression techniques may be used, such as Lempel-Ziv (LZ) compression or the like. Templates may also be grouped for efficient distribution and for transactional distribution.

In block 214, the enforcement point may store the template. The enforcement point may also store the parameters associated with the template or to be used in the template. Each parameter or set of parameters may be stored by an associated name and type of parameter or set of parameters. In block 216, the enforcement point may bind or substitute the parameters into the associated template. In block 218, the enforcement point may begin implementing or enforcing the policy associated with the template.

Figure 3:
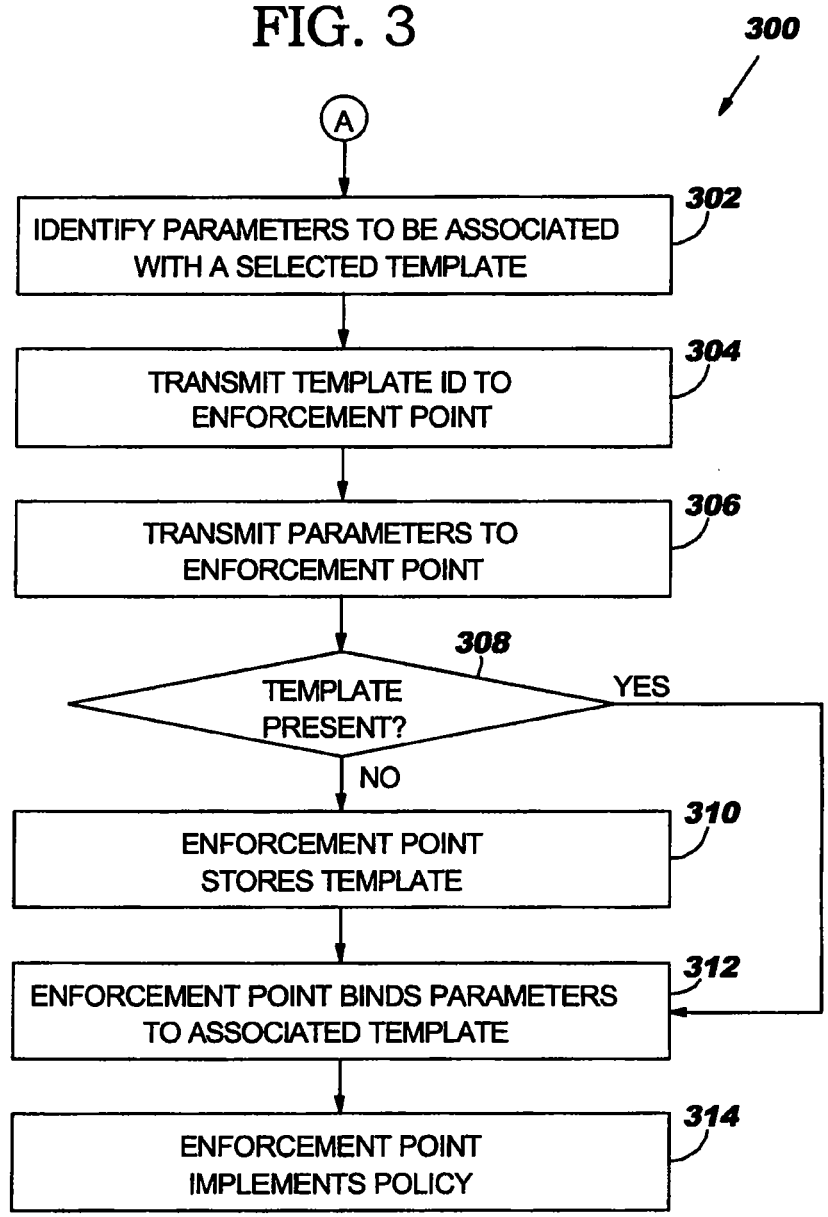
FIG. 3 is a flow chart of a method to distribute policies in accordance with another embodiment of the present invention.

FIG. 3 is a flow chart of a method 300 to distribute policies in accordance with another embodiment of the present invention. Method 300 is similar to method 200 of FIG. 2 except the template itself may be transmitted to the enforcement point rather than the ID. Alternatively, both the ID and the template may be transmitted to the enforcement point or points. In block 302, at least one set of parameters may be identified or defined to be associated with each policy template. As previously discussed, each parameter or set of parameters may be identified and stored by a name or identification and a type of parameter. In block 304, a policy template may be transmitted to each enforcement point for each policy to be enforced by the respective enforcement points. Each policy template may be compressed using data compression techniques or algorithms prior to transmission to each enforcement point. In block 306 one set of parameters to be used in each associated policy template for enforcement may be transmitted to each enforcement point enforcing the policy associated with each template.

In block 308, a determination may be made if the enforcement point already has the policy template. If the policy template is present or stored at the enforcement point, the method 300 may advance to block 312. If the transmitted policy template is not currently available or stored at the enforcement point, the enforcement point may store the new template in block 310 before the method advances to block 312. In block 312, the enforcement point may bind the parameters to the associated template. In block 314, the enforcement point may begin implementing or enforcing the policy corresponding to the policy template.

Figure 4:
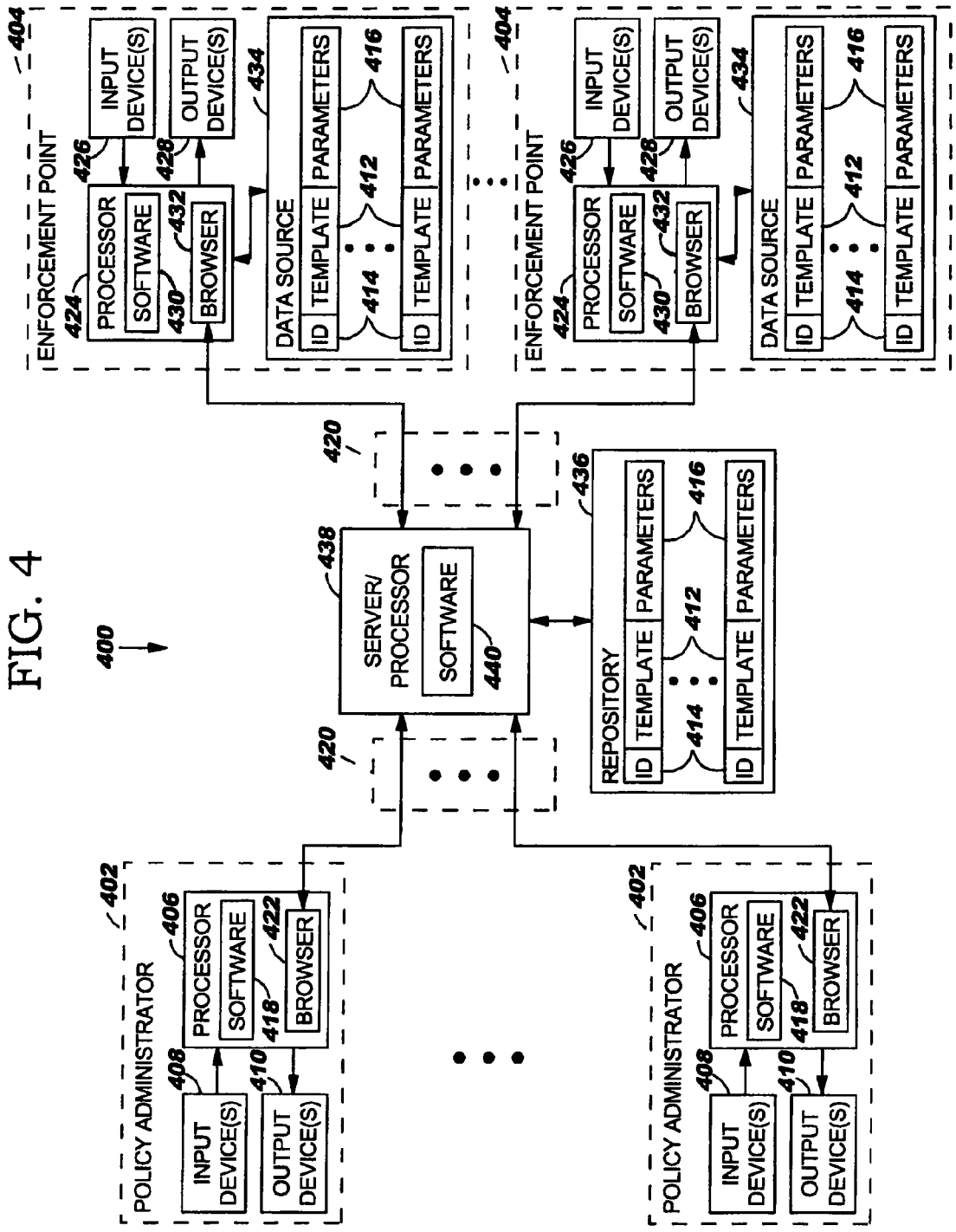
FIG. 4 is a example of a system to distribute policies in accordance with an embodiment of the present invention.

FIG. 4 is an example of a system 400 to distribute policies in accordance with an embodiment of the present invention. Elements of the methods 100, 200 and 300 of FIGS. 1, 2 and 3, respectively, may be embodied in and performed by the system 400. The system 400 may include one or more policy administrators 402 and one or more enforcement points 404. Each policy administrator 402 may include a processor 406, one or more input devices 408 and one or more output devices 410. The processor 406, input devices 408 and output devices 410 may facilitate defining policy templates 412 and assigning an ID 414 to each policy template 412. The processor 406, input devices 408 and output devices 410 may also facilitate transmitting one of the ID 414 or the policy template 412 associated with each policy to be enforced to the respective enforcement points 404 enforcing the policy. The processor 406, input devices 408 and output devices 410 may further facilitate identifying or defining parameters 416 or sets of parameters 416 associated with each template 410. The input devices 408 may include a keyboard, pointing device, voice recognition system or the like. The input devices 408 may also include optical, magnetic, infrared or radio frequency input devices or combination input/output devices, such as disk drives or the like. The input devices 408 may receive read or download software, computer-executable or readable instructions or the like, such as software 418 that may embody elements of the methods 100, 200 and 300. The software 418 may be downloaded from a communication network, system or medium, such as network or medium 420. The communication network 420 or medium may be any communication system including by way of example, dedicated communication lines, telephone networks, wireless data transmission systems, two-way cable systems, customized computer networks, interactive kiosk networks, the Internet or the like. The system or medium 420 may also be or form part of a communication channel, memory or similar devices.

The output devices 410 may include a display or monitor, printer, audio system or the like. The output devices 410 may also be coupled to a communication system, network or medium, such as the network or medium 420. The processor 406 may also include a browser 414 or the like to facilitate accessing the network or medium 420.

Each enforcement point 404 may include a processor 424, one or more input devices 426 and one or more output devices 428. The processor 424, input devices 426 and output devices 428 may facilitate the enforcement point 404 receiving the ID 414 assigned to the policy template 412 or the policy template 412 itself for each policy to be enforced by the enforcement point 404. The processor 424, input devices 426 and output devices 428 may be similar to the processor 406, input devices 408 and output devices 410 of each policy administrator 402. The enforcement point processor 424 may also include software 430, computer-readable or computer-executable instructions or the like that may embody elements of the methods 200 and 300 of FIGS. 2 and 3. Each enforcement point 404 may also include a browser 432 or the like to facilitate access to the communication network or medium 420. Each enforcement point 404 may also include a data source 434 that may store each policy template 412 and the associated or assigned ID 414 for enforcement of the policy corresponding to the template 412 by the enforcement point 404. The data source 434 may also parameters 416 bound to the template 412.

The system 400 may also include a repository 436 to store the policy templates 412 and IDs 414 assigned to each policy template 412. The repository 436 may also store parameters 416 or sets of parameters 416 associated with each policy template 412. As previously described, an enforcement point 404 may form and transmit a query in response to each policy template 412 corresponding to any IDs 414 transmitted by a policy administrator 402 not being present or stored at the enforcement point 404. The enforcement point 404 and repository 436 may apply asynchronous, out-of-band communication to transmit the query and any policy templates 412 corresponding to the query. The repository 436 may also include software and hardware to compress each policy template 412 before transmission to the enforcement point 404 to conserve resources. Alternatively, the policy templates 412 may be stored in a compressed format to further conserve resources.

The system 400 may also include a server 438, processor or the like to interface between each of the policy administrators 402, enforcement points 404 and repository 436. The server 438 may include software 440, computer-executable or computer-readable instructions or the like for operation of the system 400 in storing and distributing policy templates 412 and associated parameters 416 as described herein.

Elements of the present invention, such as methods 100, 200 and 300 of FIGS. 1, 2 and 3, respectively may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 400 of FIG. 4. Examples of such a medium may be illustrated in FIG. 4 as input devices 408 and 426 or network 420. A computer-usable or readable medium may be any medium that may contain, store, communicate or transport the program for use by or in connection with a system, such as system 400. The medium, for example, may be an electronic, magnetic, optical, electromagnetic, infrared or semiconductor system or the like. The medium may also be simply a stream of information being retrieved when the computer program product is "downloaded" through a network, such as network 420, the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to distribute policies, comprising:
defining, by a policy processor, a policy template associated with each policy;
assigning, by the policy processor, a unique identification (ID) to each policy template;
storing, by the policy processor, each policy template and assigned ID in a policy template repository;
transmitting, by the policy processor, only the assigned ID to an enforcement point for each policy to be enforced by the enforcement point;
determining, by the enforcement point, if the policy template corresponding to each transmitted ID is present at the enforcement point;
receiving a query from the enforcement point for each policy template that is not present at the enforcement point, wherein the query includes the ID for the policy template not present at the enforcement point;
transmitting the policy template from the policy template repository to the enforcement point in response to the query including the ID for the policy template;
identifying at least one set of parameters to be associated with each policy template;
transmitting the one set of parameters to be used in each associated policy template for enforcement to the enforcement point;
binding the parameters to each associated template; and
implementing the policy associated with each policy template.

2. The method of claim 1, further comprising storing each one of the at least one set of parameters by name and type.

3. The method of claim 1, wherein the policy template includes a form of "if a first parameter then a second parameter", the policy template and the parameters being transmitted separately to reduce use of communication resources by factoring the template and parameters to be used in the template and to permit different parameters to be transmitted from time to time to replace previous parameters in the policy template to change the policy associated with the policy template without the need of transmitting the entire policy or policy template again to further reduce use of communication resources.

4. The method of claim 1, further comprising applying asynchronous, out-of-band communication to query the repository and transmit any templates.

5. The method of claim 1, further comprising compressing each template before transmitting to the enforcement point.

6. The method of claim 1, further comprising forming each policy template in a structured document.

7. The method of claim 1, further comprising forming each policy template in a mark-up language.

8. A system to distribute policies, comprising:
a policy administrator to define policy templates and to transmit one of an identification (ID) assigned to a policy template or the policy template associated with each policy to be enforced;
an enforcement point to receive the ID assigned to the policy template or the policy template for each policy and to enforce each policy; and
a storage device to store each policy template and assigned ID, wherein the enforcement point determines if the policy template is present at the enforcement point in response to receiving the ID assigned to the policy template and the enforcement point transmits a query to the storage device in response to the policy template not being present at the enforcement point.

9. The system of claim 8, wherein each policy administrator comprises a processor to transmit one of the ID assigned to the policy template or the policy template associated with each policy.

10. The system of claim 8, wherein each enforcement point comprises:
a processor to receive the IDs assigned to each policy template; and
a data source to store each policy template for enforcement and assigned ID, wherein the processor forms and transmits the query in response to each policy template corresponding to any transmitted IDs not present in the data source.

11. The system of claim 8, further comprising a server to interface between each policy administrator, each enforcement point and the repository.

12. A computer program product to distribute policies, the computer program product comprising:
a non-transitory computer readable storage medium comprising hardware having computer readable program code embodied therewith, the computer readable program code comprising:
computer readable program code configured to determine if a policy template is present at an enforcement point in response to receiving an identification (ID) assigned to the policy template at the enforcement point, wherein the enforcement point determines if the policy template is present at the enforcement point;
computer readable program code configured to receive a query from the enforcement point in response to the policy template not being present at the enforcement point, wherein the query includes the ID assigned to the policy template and the repository stores a plurality of policy templates and ID assigned to each polity template;
computer readable program code configured to receive the policy template at the enforcement point, wherein the policy template is transmitted by the repository in response to the query;
computer readable program code configured to receive a set of parameters to be used in the policy template at the enforcement point, wherein the set of parameters are transmitted separately from the policy template;
computer readable program code configured to bind the parameters to the policy template; and
computer readable program code configured to implement the policy associated with the policy template.

13. The computer program product of claim 12, further comprising computer readable program code configured to apply asynchronous, out-of-band communication to transmit the query and any policy templates.

14. The computer program product of claim 12, further comprising compressing the policy template before transmitting to the enforcement point or any selected enforcement points.

15. A method to distribute policies, comprising:
receiving, by an enforcement point, only the assigned ID for each policy to be enforced by the enforcement point;
determining, by the enforcement point, if a policy template corresponding to each transmitted ID is present at the enforcement point;
transmitting, by the enforcement point, a query to a policy template repository for each policy template that is not present at the enforcement point, wherein the query includes the ID for the policy template not present at the enforcement point; and
receiving, by the enforcement point, each policy template from the policy template repository in response to the query including the ID for each policy template that is not present at the enforcement point;
receiving, by the enforcement point, a set of parameters to be used in each associated policy template that is present at the enforcement point for enforcement by the enforcement point;
binding, by the enforcement point, the set of parameters to each associated policy template; and
implementing, by the enforcement point, a policy associated with each policy template present at the enforcement point.

* * * * *